United States Patent
Huang et al.

(10) Patent No.: US 10,326,293 B2
(45) Date of Patent: Jun. 18, 2019

(54) CONTROL OF OUTPUT POWER OF A BATTERY CHARGER FOR CHARGING A BATTERY OF AN ELECTRONIC DEVICE FROM AN ENERGY SOURCE

(71) Applicant: INTEL CORPORATION, Santa Clara, CA (US)

(72) Inventors: Lilly Huang, Portland, OR (US); Wayne Proefrock, Hillsboro, OR (US); Krishnan Ravichandran, Saratoga, CA (US); Alexander Uan-Zo-Li, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 198 days.

(21) Appl. No.: 15/034,990

(22) PCT Filed: Dec. 27, 2013

(86) PCT No.: PCT/US2013/078126
§ 371 (c)(1),
(2) Date: May 6, 2016

(87) PCT Pub. No.: WO2015/099793
PCT Pub. Date: Jul. 2, 2015

(65) Prior Publication Data
US 2016/0268829 A1  Sep. 15, 2016

(51) Int. Cl.
*H02J 7/00* (2006.01)
*H01M 10/44* (2006.01)
*H02J 7/35* (2006.01)

(52) U.S. Cl.
CPC .......... *H02J 7/0055* (2013.01); *H02J 7/0081* (2013.01); *H02J 7/35* (2013.01)

(58) Field of Classification Search
CPC ........................................................ H02J 7/35
(Continued)

(56) References Cited

U.S. PATENT DOCUMENTS 6,417,649 B1 * 7/2002 Brink ........................ A61N 1/39
 320/166
6,476,586 B2 * 11/2002 Yunosawa ............... E05B 77/12
 307/108
(Continued)

FOREIGN PATENT DOCUMENTS

CN  101026316 A  8/2007
CN  103001298 A  3/2013
(Continued)

OTHER PUBLICATIONS

Office Action dated Oct. 18, 2017 for Chinese Application No. 201380081278.X, 26 pages.
(Continued)

*Primary Examiner* — Yalkew Fantu
(74) *Attorney, Agent, or Firm* — Schwabe, Williamson & Wyatt, P.C.

(57) ABSTRACT

An electronic device may include a battery charger and a controller. The battery charger may receive a voltage from an energy source, and may provide an output power. The controller may receive a voltage value of the energy source, may receive a current value from the battery charger or the energy source, may determine a power value based on the received voltage value and the received current value, and may provide at least one control signal to the battery charger to change the output power of the charger.

16 Claims, 4 Drawing Sheets

(58) Field of Classification Search
USPC .......................................................... 320/101
See application file for complete search history.

(56) References Cited

U.S. PATENT DOCUMENTS

| | | | | |
|---|---|---|---|---|
| 6,518,733 | B1* | 2/2003 | Schenkel | H02M 3/33507 |
| | | | | 320/166 |
| 7,622,898 | B2 | 11/2009 | Shimizu et al. | |
| 8,072,187 | B2* | 12/2011 | Wu | H02J 7/0008 |
| | | | | 307/46 |
| 9,166,434 | B2 | 10/2015 | Huang et al. | |
| 9,184,627 | B2* | 11/2015 | Huang | H02J 7/35 |
| 9,281,699 | B2 | 3/2016 | Huang et al. | |
| 9,287,702 | B2 | 3/2016 | Proefrock et al. | |
| 2003/0117822 | A1 | 6/2003 | Stamenic et al. | |
| 2010/0259225 | A1 | 10/2010 | Teggatz et al. | |
| 2011/0260676 | A1 | 10/2011 | Jain | |
| 2011/0273130 | A1 | 11/2011 | Lee et al. | |
| 2013/0268063 | A1 | 10/2013 | Firstenberg et al. | |

FOREIGN PATENT DOCUMENTS

| | | |
|---|---|---|
| JP | 2000-261979 | 9/2000 |
| JP | 2007-221893 | 8/2007 |
| JP | 2008-061283 * | 3/2008 |
| KR | 20070078524 A | 8/2007 |
| KR | 10-2011-0123130 | 11/2011 |

OTHER PUBLICATIONS

Supplementary Search Report dated Jul. 4, 2017 for European Application No. 13900175.4, 8 pages.
International Search Report issued in PCT/US2013/078126 dated Sep. 24, 2014.
International Preliminary Report and Written Opinion issued in PCT/US2013/078126 dated Jun. 26, 2016.
Office Action dated Jun. 4, 2018 for Chinese Application No. 201380081278.X, 31 pages.
Office Action dated May 15, 2018 for Korean Application No. 10-2016-7013216, 7 pages.
Office Action dated Oct. 29, 2018 for Korean Application No. 10-2016-7013216, 5 pages.
Office Action dated Oct. 29, 2018 for Chinese Application No. 201380081278, 28 pages.
Office Action dated Dec. 20, 2018 for Indian Application No. 201647016410, 6 pages.

* cited by examiner

CONTROL OF OUTPUT POWER OF A BATTERY CHARGER FOR CHARGING A BATTERY OF AN ELECTRONIC DEVICE FROM AN ENERGY SOURCE

CROSS-REFERENCE TO RELATED PATENT APPLICATIONS

This application is a U.S. National Stage Application under 35 U.S.C. § 371 of PCT Application No. PCT/US13/078126, filed Dec. 27, 2013, whose entire disclosure is hereby incorporated by reference.

BACKGROUND

1. Field

Embodiments may relate to a charger and charging of an electronic device.

2. Background

Power availability and battery life are factors that may impact user's experiences with electronic devices, such as a mobile device. Energy harvesting may provide an alternative power source (or an alternative energy source). A charging system may be used to provide the alternative power (or energy) to the electronic device.

BRIEF DESCRIPTION OF THE DRAWINGS

Arrangements and embodiments may be described in detail with reference to the following drawings in which like reference numerals refer to like elements and wherein.

DETAILED DESCRIPTION

In the following detailed description, like numerals and characters may be used to designate identical, corresponding and/or similar components in differing figure drawings. Further, in the detailed description to follow, example sizes/models/values/ranges may be provided although arrangements and embodiments may not be limited to the same. Where specific details are set forth in order to describe example embodiments, it should be apparent to one skilled in the art that embodiments may be practiced without these specific details.

An electronic device (or mobile device) may utilize an alternative energy source (or a harvested energy) in order to power the electronic device. However, the alternative energy source (or harvested energy) may be an unstable voltage supply. That is, an output voltage from a harvester (or other device) may vary widely. For example, the output voltage of a solar panel may range from a zero (0) voltage to a large open circuit voltage.

The electronic device may be any one of a mobile terminal, a mobile device, a mobile computing platform, a mobile platform, a laptop computer, a tablet, an ultra-mobile personal computer, a mobile Internet device, a smartphone, a personal digital assistant, a display device, a television (TV), and/or etc.

However, the alternative energy source (e.g. solar panel) may not be designed to operate directly with electronic devices since its output voltage is unregulated and also an output power (Voltage×Current) may vary widely based on environmental conditions. One arrangement may provide a "middle ware" between the alternative energy source and the electronic device to regulate a voltage and/or continuously adjust output parameters of the energy source. One example of middle ware may be a Maximum Power Point Tracking (MPPT) device. However, the MPPT device may result in an additional cost and real estate due to extra circuitry and higher material cost. Additionally, a power delivery efficiency may be lowered due to a multi-stage cascade power conversion configuration, the MPPT device and a battery charger.

Figure 1:
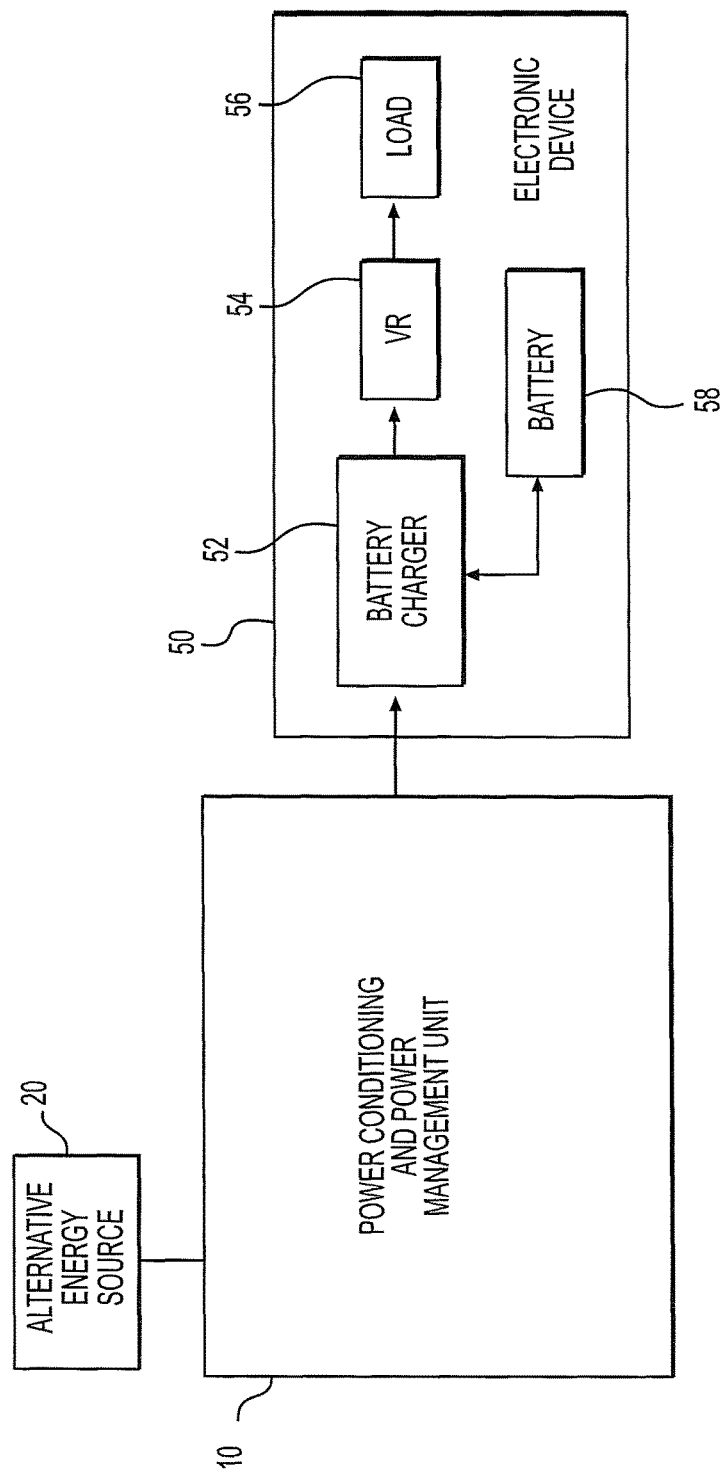
FIG. 1 shows an electronic device to receive power from an alternative energy source according to an example arrangement.

FIG. 1 shows an electronic device to receive power from an alternative energy source according to an example arrangement. Other arrangements may also be provided.

More specifically, FIG. 1 shows a power conditioning and power management unit 10 (or charging system) that includes components to charge an electronic device 50 by using an alternative energy source 20 (or alternative power source). The power conditioning and power management unit 10 is shown in FIG. 1 as being external to the electronic device 50. The power conditioning and power management unit 10 may include a MPPT device, a voltage regulator and an energy storage element, for example. In at least one embodiment, the MPPT device may include a power condition circuit, a buck/boost voltage regulator, a microcontroller, a battery charger and a battery. Other components may also be provided.

The electronic device 50 may be any one of a mobile terminal, a mobile device, a mobile computing platform, a mobile platform, a laptop computer, a tablet, an ultra-mobile personal computer, a mobile Internet device, a smartphone, a personal digital assistant, a display device, a television (TV), and/or etc.

The alternative energy source 20 may be any one of a solar energy source, a mechanical energy source (such as via wind), a photovoltaic (PV) energy source, a thermal energy source, a radio frequency (RF) energy source, a vibration energy source, a biomechanical energy source, a fuel cell and/or any other power source. Other energy sources may also be provided.

The alternative energy source 20 may provide power (or energy) to the power conditioning and power management unit 10. As one example, the alternative energy source 20 may provide an input power (or input energy) to the MPPT device. The MPPT device may be a device to dynamically tune an impedance of the connected device (or energy source) such that output power of the power source is optimal and/or a maximum available power (from a harvester) is outputted and delivered to a load.

In at least one embodiment, the MPPT device may provide a power supply to a voltage regulator based at least in part on the power (or energy) provided by the alternative energy source 20. The voltage regulator may provide an output voltage to the electronic device 50 based at least in part on a requirement of input voltage of a connected battery charger.

As shown in FIG. 1, the electronic device 50 may include a battery charger 52, a voltage regulator (VR) 54, a load 56 and a battery 58. The battery charger 52 may receive an input voltage (or power), such as from the power conditioning and power management unit 10. The battery charger 52 may provide an output voltage to the voltage regulator 54. The voltage regulator 54 (of the electronic device 50) may provide an output voltage to the load 56. The voltage regulator 54 may provide a regulated output voltage for the load 56. As one example, the load 56 may include a display device. Other types of loads may also be provided.

The battery charger 52 may also (or alternatively) provide an output voltage to a battery 58 (provided at the electronic device 50). The battery 58 may be provided in a battery port, for example. The battery 58 may be charged by the voltage received from the battery charger 52. The battery charger 52 may provide an output voltage to either the load 56 (via a voltage regulator 54) or the battery 58.

Embodiments may provide a power architecture and a control methodology (or process) to receive power from an alternative energy source (or alternative power source). Embodiments may include a battery charger (such as in a mobile device or an electronic device) and a controller that includes a control methodology (or process) for the battery charger.

Figure 2:
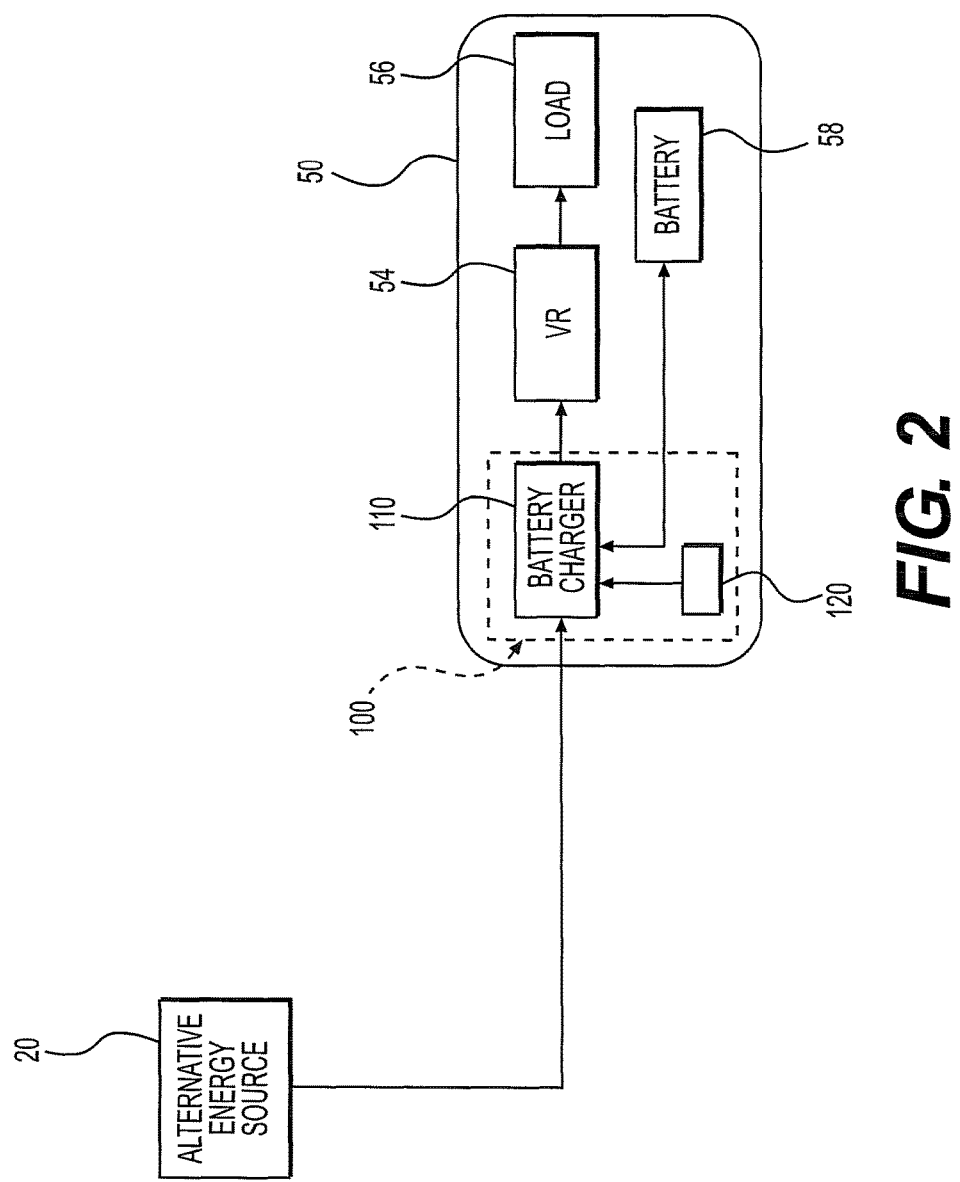
FIG. 2 shows an electronic device to receive power from an alternative energy source according to an example embodiment.

FIG. 2 shows an electronic device to receive power from an alternative energy source according to an example embodiment. Other embodiments and configurations may also be provided.

FIG. 2 shows that the electronic device 50 includes an alternative energy power manager (PM) 100, the voltage regulator 54 (or a plurality of voltage regulators), the load 56 and the battery 58 (such as in a battery port). Other components may also be provided.

The alternative energy power manager (PM) 100 may include a battery charger 110 (or charger) and a controller 120. The controller 120 may operate to control the battery charger 110 by use of a control methodology (or process). The controller 120 may include logic, circuitry, hardware and/or devices to perform operations of the control process (or a control algorithm).

A control process (or algorithm) may be stored in the controller 120, or logic, circuitry and/or hardware may perform operations of the process (or algorithm). As one example, the controller 120 may be a microcontroller, which may be a dedicated application-specific integrated circuit (ASIC) or an embedded controller.

In at least one embodiment, the controller 120 may be part of an embedded controller in another portion of the electronic device (i.e., a mobile platform). In at least one embodiment, a battery fuel gauge may be used as a controller for the battery charger.

The alternative energy source 20 may contain bounded power capacity and its output voltage may not be fixed and may strongly depend on impedance of a connected load. For example, a photovoltaic (PV) (solar) characteristic may have a maximum output power occur only at a specific point under a specific voltage and/or current. This specific point may be called a Maximum Power Point (MPP). The MPP may not be fixed and may vary depending on conditions such as sun radiation and/or ambient temperature, for example.

The battery charger 110 may charge the battery 58 under different values of charge current at a pre-defined voltage according to a specified battery current-voltage (I-V) charge profile.

The battery charger 110 may be a device that is programmable through a common input/output (I/O) bus (i.e., a System Management Bus (SMBUS)). For example, a maximum input current may be one parameter that may be programmed or adjusted on-the-fly. Values of the maximum input current may be stored in a register of the battery charger 110. With a setting of different bits to the input current register (inside the battery charger 110), different values of the maximum input current (Iin_max) may be provided (or set). The maximum input current (Iin_max) may set the upper boundary or limit for the input current to the battery charger 110 from a power source or power supply.

A sensing resister RS connected to the charger 110 may determine a measurement range and resolution of the input current. An output signal (from AMON) from the battery charger 110 may represent an actual current flow (or the input current from a power source). As will be described below, an actual current value (or actual current flow value) may be provided from the battery charger 110 to the controller 120.

Figure 3:
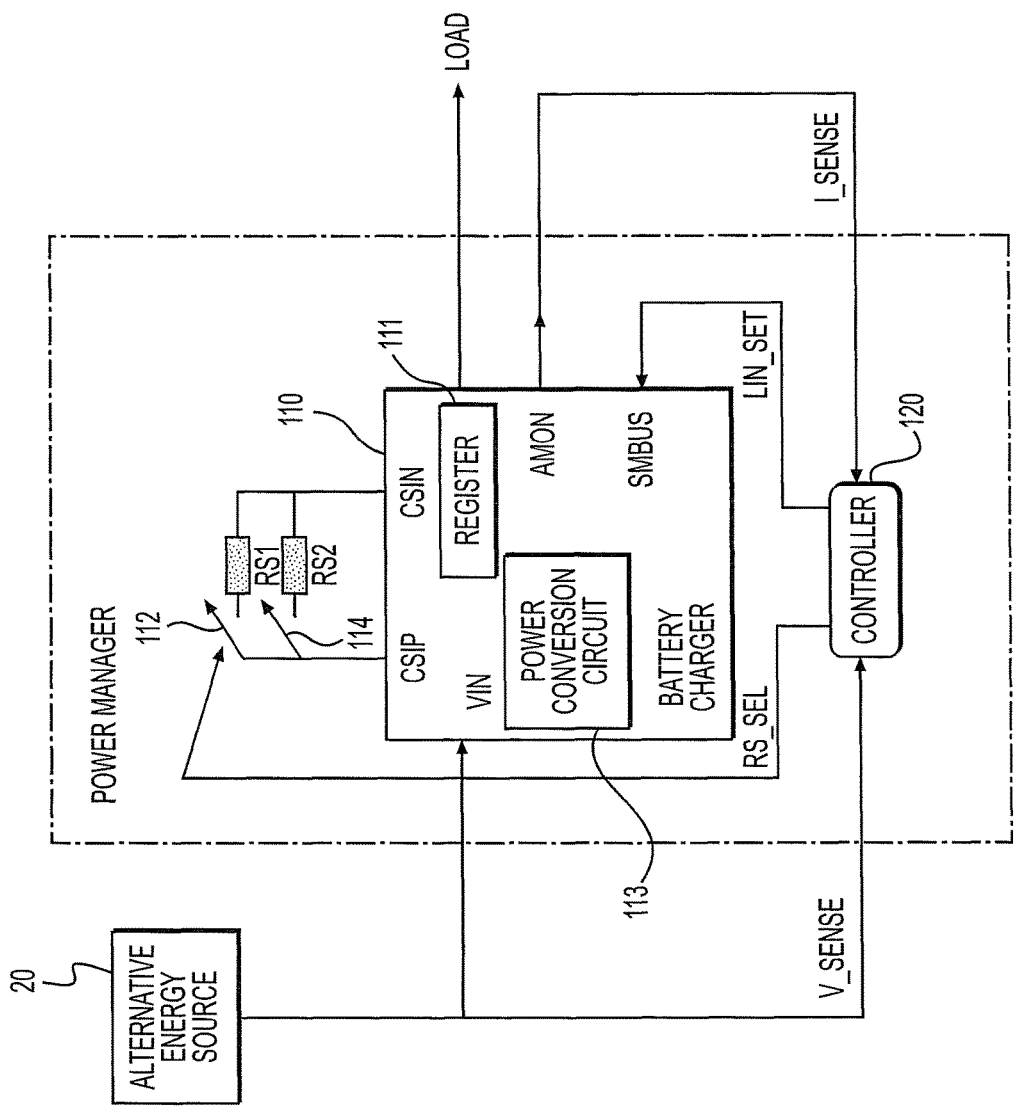
FIG. 3 shows an alternative energy power manager of an electronic device according to an example embodiment.

FIG. 3 shows an alternative energy power manager of an electronic device according to an example embodiment. Other embodiments and configurations may also be provided.

FIG. 3 shows the alternative energy power manager 100 that includes the battery charger 110 (or charger) and the controller 120.

FIG. 3 shows that the battery charger 110 includes inputs (or input ports) or outputs (or output ports), such as voltage input (Vin), an input bus (SMBUS), an output (AMON), a current sensing input positive (CSIP) port, a current sensing input negative (CSIN) port and an output. Other inputs, input ports, outputs or output ports of the battery charger 110 may also be provided.

The input bus (SMBUS) may receive a plurality of bits (Iin_SET) from the controller 120. The plurality of bits may also be at least one control signal.

The battery charger 110 may include a register 111 and a power conversion circuit 113. The register 111 may store information related to a current limit. The power conversion circuit 113 may convert a received power into an output power (of the charger 110). Other components may also be provided.

An input voltage Vin to the battery charger 110 may be monitored or detected at an output of the alternate energy source 20.

FIG. 3 also shows a first current sensing resistor RS1, a second current sensing resistor RS2, a first switch 112 to couple to the first current sensing resistor RS1 and a second switch 114 to couple to the second current sensing resistor RS2. The switches 112, 114 may operate based on RS_SEL signals (or at least one control signal) from the controller 120. Such an approach with a different sensing resistor, RS_n, may be expanded when a more stringent resolution of the input current is needed.

The current sensing input positive (CSIP) port may be coupled to a first end of each of the first current sensing resistor RS1 and to a first end of the second current sensing resistor RS2 based on operations of the switches 112, 114. The current sensing negative input (CSIN) port may be coupled to a second end of each of the first current sensing resistor RS1 and the second current sensing resistor RS2. The value of the current sensing resistor(s) may determine the range of the input current, from zero (0) to maximum (max), which the battery charger 110 can handle or measure. The value(s) of the current sensing resistor(s) may also define a resolution or accuracy of a current step under a register with finite bits.

The battery charger 110 and the controller 120 together with a control algorithm (or methodology) may perform a MPPT function.

The controller 120 may sense (or determine) a voltage value V_SENSE at an output of the alternative energy source 20. The controller 120 may receive the voltage value of the energy source. The controller 120 may sense (or determine) an input current value I_SENSE (or current value) at the battery charger 110. The controller 120 may receive a current value from the battery charger. The received input current value may represent the actual current flow. In at least one embodiment, the controller 120 may sense a current value from the battery charger or the energy source. The controller 120 may calculate (or determine) a present power (Pk) drawn from the alternative energy source 20. The controller 120 may calculate the present power based on the equation Pk=V_SENSE×I_SENSE.

If the calculated present power Pk (or present power) is less than a previous power Pk−1, then the controller 120 may provide a different plurality of bits, Iin_SET, to an input (SMBUS) of the battery charger 110. The bits input to the battery charger 110 (at the SMBUS input) may be provided to the register 111 of the battery charger 110. The newly received input bits (or at least one control signal) may increase a maximum current limit (based on the determined present power). The newly received input bits (or at least one control signal) may decrease a maximum current limit (based on the determined present power).

The battery charger 110 may change the output power of the battery charger based on a plurality of bits received from the controller. The controller may provide at least one control signal to the battery charger to change the output power of the charger.

Figure 4:
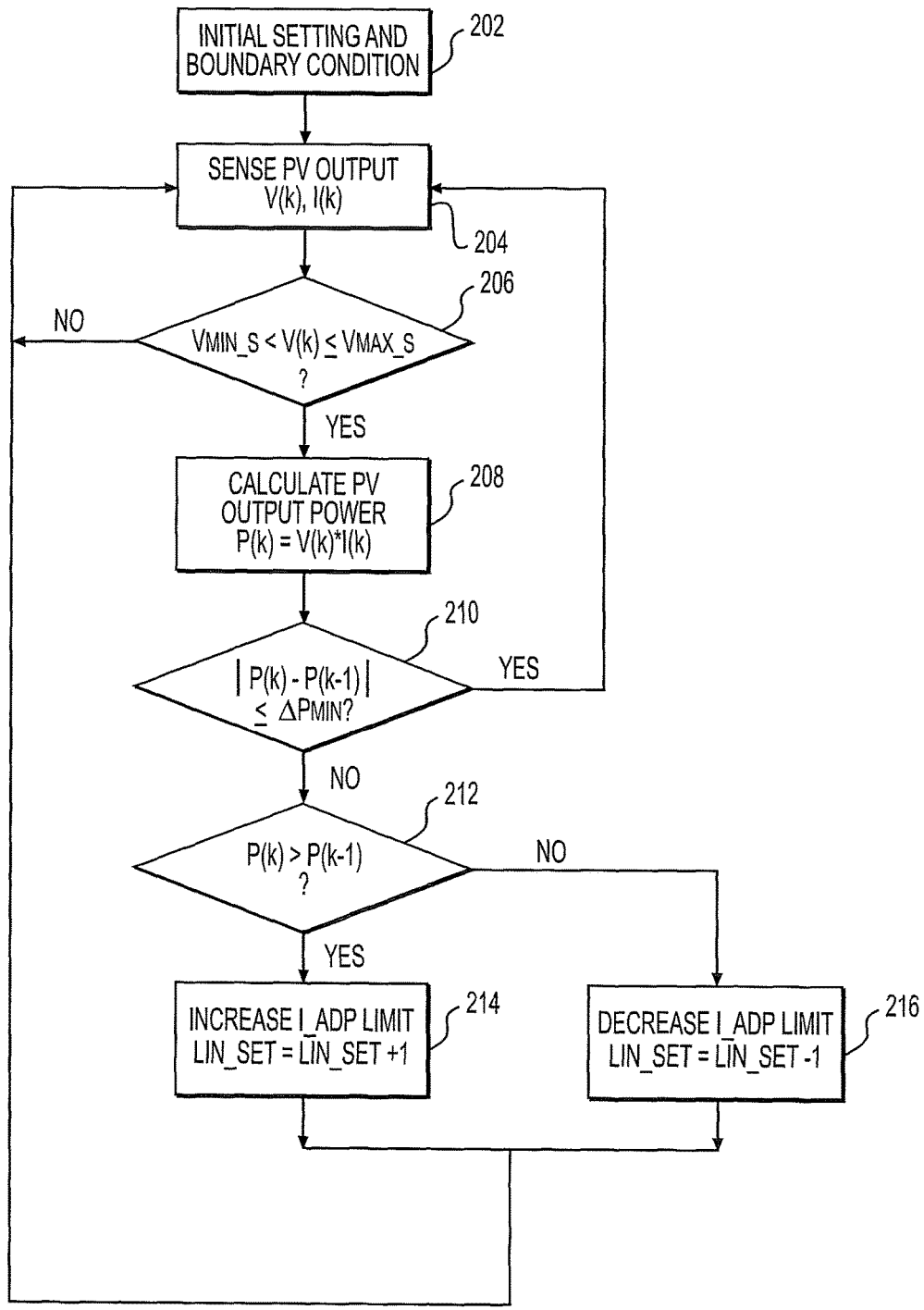
FIG. 4 is a flowchart of a control process (or methodology) according to an example embodiment.

FIG. 4 is a flowchart of a control process (or methodology) according to an example embodiment. Other embodiments and configurations may also be provided.

The operations in FIG. 4 relate to the control process or methodology provided at the controller 120. As shown in FIG. 3, the controller 120 may receive the input voltage value V_SENSE and the input current value I_SENSE, and may output at least one control signal RS_SEL (to the switches 112, 114) and at least one control signal Iin_SET (to the register 111 of the battery charger 110).

In the flowchart of FIG. 4, different variables and parameters may be discussed and/or used. V(k) may correspond to a voltage at an input of the battery charger. I(k) may correspond to an equivalent current at an input of the battery charger (or read from the register of the battery charger). P(k) may correspond to input power that is determined (or calculated) from V(k) and I(k). Additionally $\Delta P_{MIN}$ may correspond to a minimum value of a power difference accepted. Still further, Iin_SET may correspond to a maximum current that is set (or to be set) for the battery charger.

In operation 202, an initial setting and a boundary condition may be set.

The input voltage and the input current of the battery charger may be measured or sensed. In operation 204, the input power (PV) is sensed (or is determined) by V(k) and I(k).

In operation 206, a determination may be made, by the controller 120, if the $V_{min\_s} < V(k) \leq V_{max\_s}$. If the determination is YES in operation 206, then the process may proceed to operation 208. If the determination is NO in operation 206, then the process may return to operation 204. In other words, if the input voltage is within an acceptable range $V_{min\_s}-V_{max\_s}$), then the process may continue to operation 208. Otherwise, the process may return to operation 204 to measure (or sense) V(k) and I(k).

A new power value may then be calculated (or determined) by P(k)=V(k)×I(k). Operation 208 calculates (or determines) the output power by P(k)=V(k)×I(k).

The new power input value may be compared to the old power input value. If the difference is less than a minimum threshold defined ($\Delta P_{MIN}$), then the process may return to operation 204. Otherwise, the process may continue to the next operation. Operation 210 shows a determination of |P(k)−P(k−1)|<$\Delta P_{MIN}$. If the determination is YES in operation 210, then the process may return to operation 204. If the determination is NO in operation 210, then the process may continue with operation 212.

If the power increases, based on P(k)>P(k−1), then the Iin_SET value may be increased. On the other hand, if the power decreases, then the Iin_SET value may be decreased. For example, operation 212 shows a determination of P(k>P(k−1).

If the determination is YES in operation 212, then the process may continue to operation 214 where the I_ADP limit is increased (in the register) by Iin_SET=Iin_SET+1.

If the determination is NO in operation 212, then the process may continue in operation 216 where the I_ADP limit is decreased (in the register) by Iin_SET=Iin_SET−1.

After either of the operations 214, 216, the process may return to operation 204 to sense (or measure) the value of V(k) and I(k) again. The flowchart of FIG. 4 may continue operations in a loop manner.

In at least one embodiment, a computer-readable medium (or machine-accessible medium) may store a program for controlling circuitry and/or logic to perform operations of the control algorithm (or control process). The circuitry and/or logic may be controlled to control output bits (or at least one control signal) from the controller 120 to the battery charger 110. The program may be stored in a system memory, which for example, may be internal or external to the controller 120.

Instructions or code executed by the controller may be provided to a memory from a machine-readable medium (or machine-accessible medium), or an external storage device accessible via a remote connection (e.g. over a network via an antenna and/or network interface) providing access to one or more electronically-accessible media, etc. A machine-readable medium (or computer-readable medium) may include any mechanism that provides (i.e., stores and/or transmits) information in a form readable by a machine (e.g., a computer). For example, a machine-readable medium may include random access memory (RAM), read-only memory (ROM), magnetic or optical storage medium, flash memory devices, electrical, optical, acoustical or other form of propagated signals (e.g., carrier waves, infrared signals, digital signals), etc. In alternative embodiments, hard-wired circuitry may be used in place of or in combination with the instructions or code, and thus the embodiments are not limited to any specific combination of hardware circuitry and software instructions.

The program may include code or instructions to perform any of the operations or functions performed in embodiments previously discussed above.

Elements of the above described embodiments may be provided in code segments or instructions to perform tasks. The code segments or tasks may be stored in a processor readable medium (or computer-readable medium) or transmitted by a computing data signal in a carrier wave over a transmission medium or communication link. The processor readable medium, machine readable medium or computer readable medium may include any medium that can store or transfer information. Examples of the processor readable medium, machine readable medium or computer readable medium include an electronic circuit, a semiconductor memory device, a read only memory (ROM), a flash memory, an erasable ROM (EROM), a floppy diskette, a CD-ROM, an optical disk, a hard disk, a fiber optic medium, a radio frequency (RF) link, etc. The data signal may include any signal that can propagate over a transmission medium such as electronic network channels, optical fibers, air, electromagnetic, RF links, etc. The code segments or instructions may be downloaded via computer networks such as the Internet, Intranet, etc.

The following examples pertain to further embodiments.

Example 1 is an electronic device comprising: a battery charger to receive a voltage from an energy source, and to provide an output power, and a controller to receive a voltage value of the energy source, to receive a current value from the battery charger, to determine a power value based on the received voltage value and the received current value, and to provide at least one control signal to the battery charger to change the output power of the charger.

In Example 2, the subject matter of Example 1 can optionally include that the controller to determine a present power based on the received voltage value and the received current value.

In Example 3, the subject matter of Example 1 and Example 2 can optionally include that the controller to compare the determined present power with a previous power.

In Example 4, the subject matter of Example 1 and Example 2 can optionally include that the battery charger to increase a current limit of the battery charger based on the determined present power.

In Example 5, the subject matter of Example 1 and Example 2 can optionally include that the battery charger to decrease a current limit of the battery charger based on the determined present power.

In Example 6, the subject matter of Example 1 can optionally include that the energy source is at least one of a solar power source, a mechanical power source, a photovoltaic power source, a thermal power source, a radio frequency power source, a vibration power source, a biomechanical source or a fuel cell.

In Example 7, the subject matter of Example 1 can optionally include that the battery charger to change the output power of the battery charger based on a plurality of bits from the controller.

In Example 8, the subject matter of Example 1 can optionally include that the battery charger to include a register to store information related to a current limit.

In Example 9, the subject matter of Example 1 can optionally include that the battery charger includes a power conversion circuit to convert the received voltage into the output power.

In Example 10, the subject matter of Example 1 can optionally include that the controller to execute an algorithm and to provide the at least one control signal to the battery charger based at least in part on the executed algorithm.

In Example 11, the subject matter of Example 1 can optionally include at least one current sensing resistor and a switch.

In Example 12, the subject matter of Example 1 and Example 11 can optionally include that the controller to provide a control signal to the switch based on the received voltage value and the received current value.

In Example 13, the subject matter of Example 1 can optionally include a load.

In Example 14, the subject matter of Example 1 and Example 13 can optionally include that the load is a display device.

Example 15 is a method of an electronic device comprising: receiving, at a charger, a voltage from an energy source, providing an output power from the charger, receiving, at a controller, a voltage value of the energy source, receiving, at the controller, a current value from the charger, determining, at the controller, a power value based on the received voltage value and the received current value, providing at least one control signal to the charger based on the determined power value, and changing an output power of the charger based on the at least one control signal.

In Example 16, the subject matter of Example 15 can optionally include that determining the power value includes determining a present power based on the received voltage value and the received current value.

In Example 17, the subject matter of Example 15 and Example 16 can optionally include comparing the determined present power with a previous power.

In Example 18, the subject matter of Example 15 and Example 16 can optionally include that changing the output power includes increasing a current limit of the charger based on the determined present power.

In Example 19, the subject matter of Example 15 and Example 16 can optionally include that changing the output power includes decreasing a current limit of the charger based on the determined present power.

In Example 20, the subject matter of Example 15 can optionally include that the energy source is at least one of a solar power source, a mechanical power source, a photovoltaic power source, a thermal power source, a radio frequency power source, a vibration power source, a biomechanical source or a fuel cell.

In Example 21, the subject matter of Example 15 can optionally include that changing the output power is based on a plurality of bits received from the controller.

In Example 22, the subject matter of Example 15 can optionally include providing a control signal to a switch of at least one current sensing resistor based on the received voltage value and the received current value.

Example 23 is a machine-readable medium comprising one or more instructions that when executed on a controller to perform one or more operations to: determine a power value of a charger based on a voltage value received from an energy source and a received current value, provide at least one control signal to the charger based on the determined power value to change an output power of the charger.

In Example 24, the subject matter of Example 23 can optionally include that determining the power value includes determining a present power based on the received voltage value and the received current value.

In Example 25, the subject matter of Example 23 and Example 24 can optionally include one or more instructions that when executed on a controller to compare the determined present power with a previous power.

In Example 26, the subject matter of Example 23 and Example 24 can optionally include that the at least one control signal to increase a current limit of the charger based on the determined present power.

In Example 27, the subject matter of Example 23 and Example 24 can optionally include that the at least one control signal to decrease a current limit of the charger based on the determined present power.

In Example 28, the subject matter of Example 23 can optionally include that providing the at least one control signal includes providing a plurality of bits to the charger.

In Example 29, the subject matter of Example 23 can optionally include one or more instructions that when executed on a controller to provide at least one control signal to a switch of at least one current sensing resistor based on the received voltage value and the received current value.

Example 30 is an electronic device comprising: first means for providing an output power, second means for determining a power value based on a voltage value received from an energy source and a received current value, and third means for providing at least one control signal to change the output power based on the determined power value.

In Example 31, the subject matter of Example 30 can optionally include that the second means for determining to determine a present power based on the received voltage value and the received current value.

In Example 32, the subject matter of Example 30 and Example 31 can optionally include that the second means for determining to compare the determined present power with a previous power.

In Example 33, the subject matter of Example 30 and Example 31 can optionally include that the first means for providing at least one control signal to increase a current limit based on the determined present power.

In Example 34, the subject matter of Example 30 and Example 31 can optionally include that the first means for providing at least one control signal to decrease a current limit based on the determined present power.

In Example 35, the subject matter of Example 30 can optionally include that the first means for providing an output power to change the output power based on a plurality of bits corresponding to the at least one control signal.

In Example 36, the subject matter of Example 30 can optionally include that the first means for providing an output power to include a register to store information related to a current limit.

In Example 37, the subject matter of Example 30 can optionally include that the first means for providing the output power includes a power conversion circuit to change a received voltage to the output power.

In Example 38, the subject matter of Example 30 can optionally include that the third means for providing at least one control signal to execute an algorithm and to provide the at least one control signal based at least in part on the executed algorithm.

In Example 39, the subject matter of Example 30 can optionally include at least one current sensing resistor and a switch.

In Example 40, the subject matter of Example 30 and Example 39 can optionally include that the third means for providing at least one control signal to provide at least one control signal to the switch based on the received voltage value and the received current value.

In Example 41, the subject matter of Example 30 can optionally include a load.

In Example 42, the subject matter of Example 30 and Example 41 can optionally include that the load is a display device.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An electronic device comprising:
   a battery charger to receive a voltage from an energy source, and to provide an output power; and
   a controller to:
      receive a voltage value of the energy source;
      receive a current value from the battery charger;
      determine a present power value based on the received voltage value and the received current value;
      compare the present power value with a previous power value to determine if a difference between the present power value and the previous power value is greater than a threshold; and
      if the difference is greater than the threshold, provide at least one control signal to the battery charger to change the output power of the battery charger.

2. The electronic device of claim 1, wherein the battery charger is to increase a current limit of the battery charger based on the determined present power value.

3. The electronic device of claim 1, wherein the battery charger is to decrease a current limit of the battery charger based on the determined present power value.

4. The electronic device of claim 1, wherein the energy source is at least one of a solar power source, a mechanical power source, a photovoltaic power source, a thermal power source, a radio frequency power source, a vibration power source, a biomechanical source or a fuel cell.

5. A method of an electronic device comprising:
   receiving, at a charger, a voltage from an energy source;
   providing an output power from the charger;
   receiving, at a controller, a voltage value of the energy source;
   receiving, at the controller from the charger, a current value to indicate an input current to the charger;
   determining, at the controller, a present power value based on the received voltage value and the received current value;
   determining if a difference between the present power value and a previous power value is greater than a threshold;
   if the difference is greater than the threshold, providing at least one control signal to the charger based on the determined present power value; and
   changing an output power of the charger based on the at least one control signal.

6. The method of claim 5, wherein changing the output power includes increasing a current limit of the charger based on the determined present power value.

7. The method of claim 5, wherein changing the output power includes decreasing a current limit of the charger based on the determined present power value.

8. The method of claim 5, wherein the energy source is at least one of a solar power source, a mechanical power source, a photovoltaic power source, a thermal power source, a radio frequency power source, a vibration power source, a biomechanical source or a fuel cell.

9. The method of claim 5, wherein changing the output power is based on a plurality of bits received from the controller.

10. The method of claim 5, further comprising providing a control signal to a switch of at least one current sensing resistor based on the received voltage value and the received current value.

11. A machine-readable medium comprising one or more instructions that when executed on a controller to perform one or more operations is to:
   determine a present power value of a charger based on a voltage value received from an energy source and a received current value that corresponds to an input current to the charger;
   determine that a difference between the present power value and a previous power value is greater than a threshold; and
   responsive to the determination that the difference is greater than the threshold, provide at least one control signal to the charger based on the determined present power value to change an output power of the charger.

12. The machine-readable medium of claim 11, wherein the at least one control signal is to increase a current limit of the charger based on the determined present power value.

13. The machine-readable medium of claim 11, wherein the at least one control signal is to decrease a current limit of the charger based on the determined present power value.

14. An electronic device comprising:
   first means for providing an output power;
   second means for:
      determining a present power value based on a voltage value received from an energy source and a received current value that corresponds to an input current to the first means; and
      determining whether a difference between the present power value and a previous power value is greater than a threshold; and
   third means for, if it is determined that the difference is greater than the threshold, providing at least one control signal to change the output power.

15. The electronic device of claim 14, wherein the first means for providing at least one control signal is to increase a current limit based on the determined present power value.

16. The electronic device of claim 14, wherein the first means for providing at least one control signal is to decrease a current limit based on the determined present power value.

* * * * *